United States Patent
Richardson et al.

(10) Patent No.: US 8,821,113 B2
(45) Date of Patent: Sep. 2, 2014

(54) AIR CYCLE MACHINE SEAL LAND

(75) Inventors: Victoria S. Richardson, Hartford, CT (US); Lawrence Binek, Windsor, CT (US); Craig M. Beers, Wethersfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 793 days.

(21) Appl. No.: 12/974,101

(22) Filed: Dec. 21, 2010

(65) Prior Publication Data

US 2012/0156011 A1 Jun. 21, 2012

(51) Int. Cl.
*F01D 11/00* (2006.01)
*F16J 15/44* (2006.01)

(52) U.S. Cl.
CPC ...................................... *F16J 15/44* (2013.01)
USPC ....................... 415/170.1; 415/174.2; 415/229

(58) Field of Classification Search
USPC ................ 415/170.1, 174.5, 168.4, 229, 230; 416/174; 277/500, 585–587, 589
See application file for complete search history.

(56) References Cited

U.S. PATENT DOCUMENTS

| | | | |
|---|---|---|---|
| 2,859,986 A * | 11/1958 | Josephson | 277/585 |
| 4,500,098 A | 2/1985 | Wilcox et al. | |
| 4,655,683 A | 4/1987 | Chaplin | |
| 4,820,119 A | 4/1989 | Joyce | |
| 5,224,842 A | 7/1993 | Dziorny et al. | |
| 5,704,760 A | 1/1998 | Bouchard et al. | |
| 5,988,649 A * | 11/1999 | Van Ryper et al. | 277/435 |
| 7,025,356 B1 | 4/2006 | Cheung et al. | |
| 7,402,020 B2 | 7/2008 | Beers et al. | |
| 7,635,251 B2 | 12/2009 | Duesler et al. | |
| 2008/0232954 A1 * | 9/2008 | Dittmar | 415/116 |
| 2009/0184475 A1 | 7/2009 | Dobek et al. | |
| 2009/0191068 A1 | 7/2009 | St. Aubin et al. | |
| 2009/0230628 A1 | 9/2009 | Dobek et al. | |
| 2009/0274548 A1 * | 11/2009 | Joco et al. | 415/112 |

FOREIGN PATENT DOCUMENTS

CN 201110377 9/2008

* cited by examiner

*Primary Examiner* — Edward Look
*Assistant Examiner* — Maxime Adjagbe
(74) *Attorney, Agent, or Firm* — Carlson, Gaskey & Olds, P.C.

(57) ABSTRACT

An air cycle machine includes a bearing housing with a shaft bore. A rotor shaft is arranged in the shaft bore and includes knife edges extending from the rotor shaft. A seal engages the shaft bore and includes an outer diameter and an inner diameter providing a seal land axially aligned with the knife edges. A radial clearance between the seal land and the knife edges is nominally 0.006 inch. The inner diameter is arranged between lateral sides of the seal that define a width. In one example, a tapered surface extending at an angle relative to the outer diameter from the lateral side to the seal land, the tapered surface facing the large end. The outer diameter to the inner diameter provides a first ratio of 1.25-1.28, and the inner diameter to the width provides a second ratio of 4.33-5.58.

18 Claims, 2 Drawing Sheets

AIR CYCLE MACHINE SEAL LAND

BACKGROUND

This disclosure relates to a seal provided between a shaft and a housing of an air cycle machine.

An air cycle machine may include a centrifugal compressor and a centrifugal turbine mounted for co-rotation on a shaft within a housing. The centrifugal compressor further compresses partially compressed air, such as bleed air received from a compressor of a gas turbine engine. The compressed air discharges to a downstream heat exchanger or other use before returning to the centrifugal turbine. The compressed air expands in the turbine to thereby drive the compressor. The air output from the turbine may be utilized as an air supply for a vehicle, such as the cabin of an aircraft.

The shaft is rotationally supported by air bearings within the housing. A variety of seals are used between the shaft and the housing to seal the shaft relative to the housing. Some prior seals have an outer diameter/length/width of 3.460/0.685/0.16 inch (87.88/17.40/4.1 mm), 2.706/0.370/0.21 inch (68.73/9.40/5.3 mm) or 1.875/0.455/0.14 inch (47.63/11.30/3.6 mm).

SUMMARY

An air cycle machine includes a bearing housings with a shaft bore. A rotor shaft is arranged in the shaft bore and includes knife edges extending from the rotor shaft. A seal engages the shaft bore and includes an outer diameter and an inner diameter providing a seal land axially aligned with the knife edges. A radial clearance between the seal land and the knife edges is nominally 0.006 inch in one example.

The inner diameter is arranged between lateral sides of the seal that define a width. In one example, a tapered surface extending at an angle relative to the outer diameter from the lateral side to the seal land, the tapered surface facing the large end. The outer diameter to the inner diameter provides a first ratio of 1.25-1.28, and the inner diameter to the width provides a second ratio of 4.33-5.58.

BRIEF DESCRIPTION OF THE DRAWINGS

The disclosure can be further understood by reference to the following detailed description when considered in connection with the accompanying drawings wherein.

DETAILED DESCRIPTION

Figure 1:
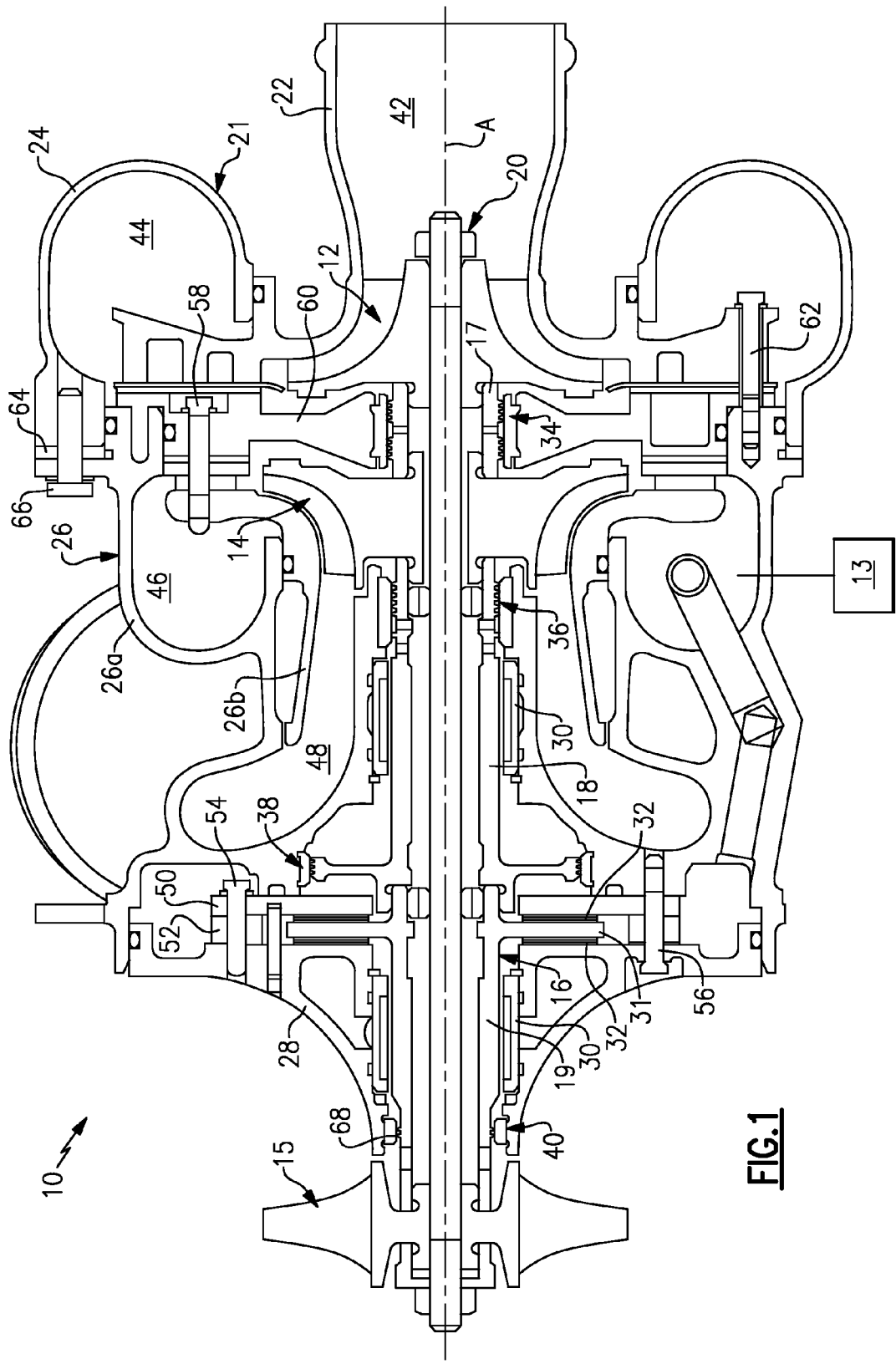
FIG. 1 is a cross-section of an example air cycle machine.

FIG. 1 illustrates an air cycle machine (ACM) 10 having a compressor 12 coupled to a turbine 14 by a shaft 16, which is stainless steel for example, for rotation together about an axis A. The turbine 14 is incorporated into a cabin air supply system 13 for providing conditioned air to an aircraft, for example. A fan 15 supported by the shaft 16 circulates the conditioned air within the cabin air supply system 13.

The ACM 10 is constructed from multiple portions to facilitate assembly. For example, the ACM 10 includes a housing 21 having inlet, compressor, turbine and bearing housing portions 22, 24, 26, 28. The example shaft 16 is constructed from multiple portions also. For example, the compressor 12 is mounted on first shaft portion 17 and arranged within the inlet housing portion 22; the turbine 14 is mounted between first and second shaft portions 17, 18 within the turbine housing portion 26; and a third shaft portion 19 is mounted within the bearing housing portion 28. A tie rod 20 secures the compressor 12, turbine 14, fan 15 and first, second, third shaft portions 17, 18, 19 to one another.

Journal bearings 30 rotationally support the second and third shaft portions 18, 19 respectively within the turbine and bearing housing portions 26, 28. A thrust runner 31 extends radially from the third shaft portion 19 and is axially arranged between thrust bearings 32. A retaining plate 50 is secured to the bearing housing portion 28 about the thrust runner 31 and thrust bearings 32 by first fasteners 54. An inlet plate 52 is provided between the bearing housing portion 28 and the retaining plate 50 radially outward of the thrust runner 31 to control the flow of lubricating air to the thrust bearings 32. Second fasteners 56 secure the bearing and turbine housing portions 28, 26 to one another.

The housing portions are sealed relative to one another to contain the compressed air within the desired passageways within the ACM 10. However, the seals also are designed to control the amount of air leakage from the compressor 12 and the turbine 14 within the ACM 10 to lubricate the journal and thrust bearings 30, 32. In the example, a first seal 34 is arranged between the first shaft portion 17 and an intermediate housing portion 60; second and third seals 36, 38 are arranged between the second shaft portion 18 and the turbine housing portion 26; and a fourth seal 40 is arranged between the third shaft portion 19 and the bearing housing portion 28.

The inlet housing portion 22 provides a compressor inlet 42, and the compressor housing portion 24 provides a compressor outlet 44. The turbine housing portion 26, which includes first and second turbine housing portions 26a, 26b, provides a turbine inlet 46 and a turbine outlet 48. Third fasteners 58 secure the turbine and intermediate housing portions 26, 60 to one another, and fourth fasteners 62 secure the inlet and turbine housing portions 22, 26 to one another.

A seal plate 64 is secured between the compressor and turbine housing portions 24, 26 by fifth fasteners 66. Air flows into the compressor inlet 42 and is compressed centrifugally to compressor outlet 44 where it is routed to turbine inlet 46. The compressed air expands through the turbine 14 and exits the turbine outlet 48.

Figure 2:
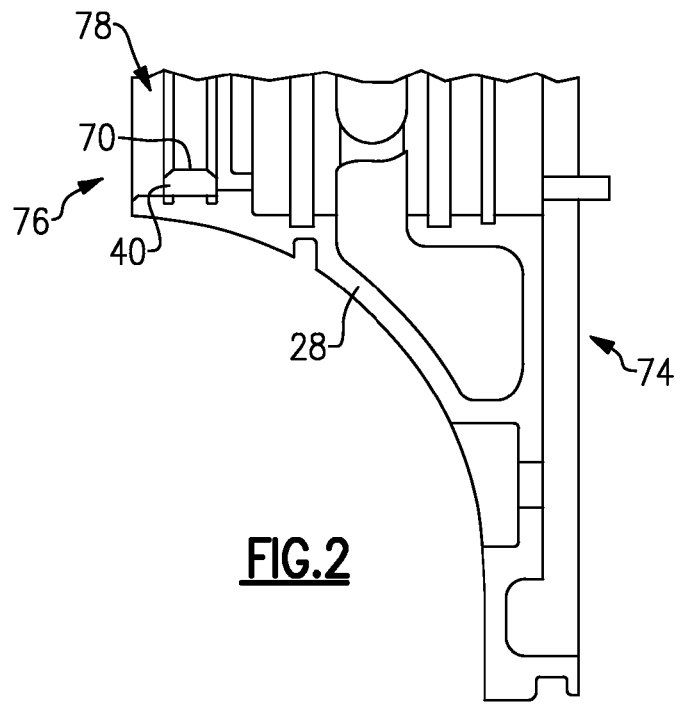
FIG. 2 is an enlarged cross-sectional view of a portion of the ACM of FIG. 1.
Figure 3:
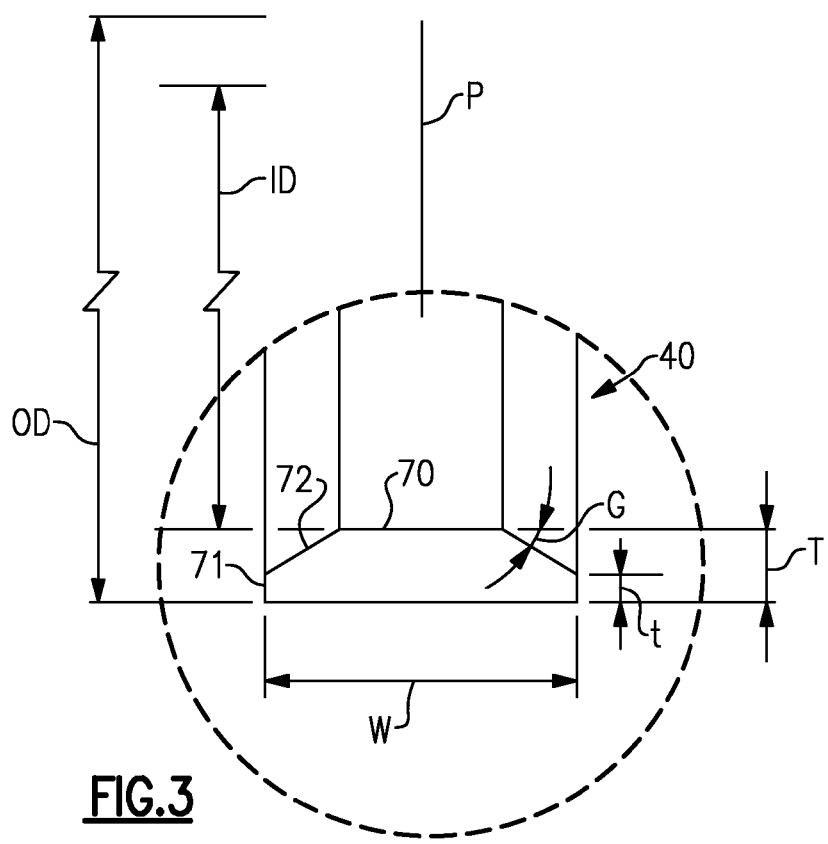
FIG. 3 is a further enlarged cross-sectional view of a seal illustrated in FIG. 2.

The fourth seal 40, which is constructed from a polyimide material, cooperates with knife edges 68 on the third shaft portion 19 to seal air within the ACM 10, while permitting some air leakage past the seal 40 at a desired rate. The fourth seal 40 is shown in more detail in FIGS. 2 and 3 and is provided by an annular body having an outer diameter OD and an inner diameter ID, which are provided between lateral sides 71 defining a width W. The bearing housing 28 has large and small ends 74, 76 opposite one another. The small end 76 includes a shaft bore 78. The inner diameter ID provides a seal land 70 that engages rotating surfaces of the knife edges 68. The outer diameter OD to the inner diameter ID provides a first ratio (OD/ID) of 1.25-1.28, and the inner diameter ID to the width W provides a second ratio (ID/W) of 4.33-5.58.

The outer diameter OD is nominally about 1.050 inch (26.67 mm), and the inner diameter ID is nominally about 0.830 inch (21.08 mm) in an uninstalled condition. The diametral thickness 2T, or length, is nominally 0.220 inch (5.59 mm) in one example. The width W is nominally about 0.170 inch (4.32 mm). The fourth seal 40 is pressed into the shaft bore 78. The outer diameter is nominally about 1.045 inch (26.54 mm), and the inner diameter is nominally about 0.816 inch (20.73 mm) in an installed condition. The third shaft portion 19 is inserted into the fourth seal 40. A radial clearance is provided between the seal land 70 and the knife edges 68 of nominally 0.006 inch (0.15 mm).

A tapered surface 72 extends nominally at a 40 degree angle G relative to the inner or outer diameters ID, OD from the lateral side 71 to the seal land 70 beginning from a radial distance t of nominally 0.085 inch (2.16 mm) from the outer diameter OD. In the example, tapered surfaces 72 are provided at each of the lateral sides 71, and the fourth seal 40 is symmetrical in a plane P perpendicular to a central axis A of the inner diameter ID and bisecting the outer diameter OD.

A method of installing the seal 40 (e.g., fourth seal) into the air cycle machine 10 is provided where the seal 40 has an inner diameter ID providing a seal land 70 configured to engage a rotating surface, e.g., knife edges 68. The inner diameter ID is arranged between lateral sides 71 of the seal 40 that define a width W. The outer diameter OD to the inner diameter ID provides a first ratio of 1.25-1.28, and the inner diameter ID to the width W provides a second ratio of 4.33-5.58. The seal 40 is pressed into the bearing housing shaft bore 78 of the air cycle machine 10. The rotor shaft 16 is inserted into the seal 40 and to axially align the knife edges 68 on the rotor shaft 16 with the seal 40 to provide a radial clearance between the seal land 70 and the knife edges 68 of nominally about 0.006 inch.

Although an example embodiment has been disclosed, a worker of ordinary skill in this art would recognize that certain modifications would come within the scope of the claims. For that reason, the following claims should be studied to determine their true scope and content.

What is claimed is:

1. A seal for an air cycle machine comprising:
   an annular body having an outer diameter and an inner diameter provided between lateral sides defining a width, the inner diameter providing a seal land configured to engage a rotating surface, the outer diameter to the inner diameter providing a first ratio of 1.25-1.28, and the inner diameter to the width providing a second ratio of 4.33-5.58, wherein the outer diameter is nominally about 1.050 inch and the inner diameter is nominally about 0.830 inch in an uninstalled condition, and the width is nominally about 0.170 inch, wherein a ratio of width to radial thickness is nominally 1.54.

2. The seal according to claim 1, wherein the outer diameter is nominally about 1.045 inch and the inner diameter is nominally about 0.816 inch in an installed condition.

3. The seal according to claim 1, comprising a tapered surface extending nominally at a 40 degree angle relative to the outer diameter from the lateral side to the seal land beginning from a radial distance of nominally 0.085 inch from the outer diameter.

4. The seal according to claim 1, wherein the annular body is constructed from a polyimide.

5. A sealing arrangement for an air cycle machine comprising:
   a bearing housing having large and small ends opposite one another, the small end including a shaft bore; and
   a seal engaging the shaft bore and including an inner diameter providing a seal land, the inner diameter arranged between lateral sides of the seal that define a width, and a tapered surface extending at an angle relative to an outer diameter from the lateral side to the seal land, the tapered surface facing the large end, the outer diameter to the inner diameter providing a first ratio of 1.25-1.28, and the inner diameter to the width providing a second ratio of 4.33-5.58, wherein the outer diameter is nominally about 1.050 inch and the inner diameter is nominally about 0.830 inch in an uninstalled condition, and the width is nominally about 0.170 inch, wherein a ratio of width to radial thickness is nominally 1.54.

6. The sealing arrangement according to claim 5, wherein the tapered surface extends nominally at a 40 degree angle relative to the outer diameter from the lateral side to the seal land beginning from a radial distance of nominally 0.085 inch from the outer diameter.

7. The sealing arrangement according to claim 6, wherein the tapered surface is provided on each of the lateral sides and the seal is symmetrical in a plane perpendicular to a central axis of the inner diameter and bisecting the outer diameter.

8. The sealing arrangement according to claim 5, wherein the inner diameter is nominally about 0.816 inch in an installed condition.

9. The sealing arrangement according to claim 5, wherein the seal is constructed from a polyimide.

10. An air cycle machine comprising:
    a bearing housing including a shaft bore;
    a rotor shaft arranged in the shaft bore and including knife edges extending from the rotor shaft; and
    a seal engaging the shaft bore and including an outer diameter and an inner diameter providing a seal land axially aligned with the knife edges, a radial clearance between the seal land and the knife edges nominally 0.006 inch, the outer diameter to the inner diameter providing a first ratio of 1.25-1.28, and the inner diameter to the width provides a second ratio of 4.33-5.58, wherein the outer diameter is nominally about 1.050 inch and the inner diameter is nominally about 0.830 inch in an uninstalled condition, and the width is nominally about 0.170 inch, wherein a ratio of width to radial thickness is nominally 1.54.

11. The air cycle machine according to claim 10, wherein the housing has large and small ends opposite one another, the small end including the shaft bore, the inner diameter is arranged between lateral sides of the seal, and a tapered surface extending at an angle relative to the outer diameter from the lateral side to the seal land, the tapered surface facing the large end.

12. The air cycle machine according to claim 11, wherein the tapered surface extends nominally at a 40 degree angle relative to the outer diameter from the lateral side to the seal land beginning from a radial distance of nominally 0.085 inch from the outer diameter.

13. The air cycle machine according to claim 10, wherein the inner diameter is arranged between lateral sides of the seal that define a width, the inner diameter is nominally about 0.816 inch in an installed condition.

14. The air cycle machine according to claim 10, wherein the seal is polyimide, and the rotor shaft is stainless steel.

15. A method of installing a seal into an air cycle machine comprising:
    providing a seal having an inner diameter providing a seal land configured to engage a rotating surface, the inner diameter arranged between lateral sides of the seal that define a width, an outer diameter to the inner diameter providing a first ratio of 1.25-1.28, and the inner diameter to the width providing a second ratio of 4.33-5.58, wherein the outer diameter is nominally about 1.050 inch and the inner diameter is nominally about 0.830 inch in an uninstalled condition, and the width is nominally about 0.170 inch, wherein a ratio of width to radial thickness is nominally 1.54; and
    pressing the seal into a bearing housing shaft bore of the air cycle machine.

16. The method according to claim 15, wherein a tapered surface extends at an angle relative to the outer diameter from the lateral side to the seal land the tapered surface extends nominally at a 40 degree angle relative to the outer diameter from the lateral side to the seal land beginning from a radial distance of nominally 0.085 inch from the outer diameter, the tapered surface is provided on each of the lateral sides and the seal is symmetrical in a plane perpendicular to a central axis of the inner diameter and bisecting the outer diameter.

17. The method according to claim 15, comprising the step of inserting a rotor shaft into the seal and axially aligning knife edges on the rotor shaft with the seal to provide a radial clearance between the seal land and the knife edges of nominally about 0.006 inch.

18. The method according to claim 15, wherein the seal is polyimide, and the rotor shaft is stainless steel.

* * * * *